(12) United States Patent
Inoue et al.

(10) Patent No.: US 9,366,767 B2
(45) Date of Patent: Jun. 14, 2016

(54) RADIATION DETECTING APPARATUS AND RADIATION DETECTING SYSTEM

(71) Applicant: CANON KABUSHIKI KAISHA, Tokyo (JP)

(72) Inventors: Masato Inoue, Kumagaya (JP); Shinichi Takeda, Honjo (JP); Satoru Sawada, Fujioka (JP); Takamasa Ishii, Honjo (JP); Taiki Takei, Yokohama (JP); Kota Nishibe, Honjo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/212,064

(22) Filed: Mar. 14, 2014

(65) Prior Publication Data
US 2014/0284486 A1   Sep. 25, 2014

(30) Foreign Application Priority Data
Mar. 19, 2013   (JP) .................................. 2013-056433

(51) Int. Cl.
*G01T 1/20* (2006.01)
*G01T 1/202* (2006.01)

(52) U.S. Cl.
CPC ...................................... *G01T 1/202* (2013.01)

(58) Field of Classification Search
CPC ........ G01T 1/202; G01T 1/2023; G01T 1/208
See application file for complete search history.

(56) References Cited

U.S. PATENT DOCUMENTS

| | | | |
|---|---|---|---|
| 6,146,489 A * | 11/2000 | Wirth ............................ | 156/280 |
| 7,256,404 B2 | 8/2007 | Inoue et al. | |
| 7,391,029 B2 | 6/2008 | Takeda et al. ............ | 250/370.11 |
| 7,514,686 B2 | 4/2009 | Ogawa et al. | |
| 7,595,493 B2 | 9/2009 | Okada et al. | |
| 7,692,152 B2 | 4/2010 | Inoue | |
| 8,304,735 B2 | 11/2012 | Inoue et al. | |
| 2006/0033031 A1 | 2/2006 | Takeda et al. ............ | 250/370.11 |
| 2012/0193540 A1 * | 8/2012 | Nakatsugawa et al. ... | 250/361 R |
| 2012/0318990 A1 | 12/2012 | Tsujii et al. | |
| 2013/0322598 A1 | 12/2013 | Saruta et al. | |
| 2014/0034836 A1 | 2/2014 | Takei et al. | |
| 2014/0103216 A1 | 4/2014 | Sasaki et al. | |

FOREIGN PATENT DOCUMENTS

| | | |
|---|---|---|
| JP | 2000-284053 | 10/2000 |
| JP | 2006-52986 | 2/2006 |

OTHER PUBLICATIONS

U.S. Appl. No. 14/200,142, filed Mar. 7, 2014.

* cited by examiner

*Primary Examiner* — David Porta
*Assistant Examiner* — Edwin Gunberg
(74) *Attorney, Agent, or Firm* — Fitzpatrick, Cella, Harper & Scinto

(57) ABSTRACT

A radiation detecting apparatus includes a scintillator and a photoelectric conversion panel. The photoelectric conversion panel includes a frame member disposed on an outer side of a photoelectric conversion section along at least a portion of one side of the photoelectric conversion panel. The frame member includes an inclined surface having a downward slope toward the photoelectric conversion section. The scintillator includes a first scintillator formed continuously on the inclined surface of the frame member and a surface of the photoelectric conversion section, and a second scintillator formed on the first scintillator. The first scintillator has a non-columnar crystal structure, and the second scintillator has a columnar crystal structure.

19 Claims, 5 Drawing Sheets

RADIATION DETECTING APPARATUS AND RADIATION DETECTING SYSTEM

BACKGROUND OF THE INVENTION

1. Field of the Invention

The present invention relates to a radiation detecting apparatus and a radiation detecting system to be used in a medical diagnosis equipment, a non-destructive inspection equipment, and the like.

2. Description of the Related Art

In recent years, research and development have been widely conducted on a digital radiation detecting apparatus including a phosphor layer as a wavelength converter for converting an X-ray into visible light and a two-dimensional photodetector including photoelectric conversion elements arranged in a two-dimensional manner. The digital radiation detecting apparatus has advantages in that image characteristics are excellent and data can be shared by loading the data in a computer system in a network due to the digital property of the data.

Japanese Patent Application Laid-Open No. 2000-284053 discloses a radiation detecting apparatus in which an upper portion and a side portion of a phosphor layer are covered with a protecting film made of an organic material, and in an outer peripheral area of a photoelectric conversion panel, a resin frame is provided in a manner that the resin frame is brought into contact with a surface of a passivation film and a surface of the protecting film.

Further, Japanese Patent Application Laid-Open No. 2006-52986 discloses a radiation detecting apparatus in which a frame member is provided so as to define a phosphor layer forming area and function as a phosphor protecting layer, and a phosphor protecting layer is provided on a phosphor layer provided in the frame member and having a columnar crystal structure, and on the frame member. In Japanese Patent Application Laid-Open No. 2000-284053 and Japanese Patent Application Laid-Open No. 2006-52986, peeling of the phosphor layer is prevented by improving moisture-proofness for the phosphor layer through use of the resin frame member provided around the phosphor layer. However, in the radiation detecting apparatus including the phosphor layer of the columnar crystal that is formed on a light receiving portion of the photoelectric conversion panel, the phosphor layer is formed by vapor deposition in a high temperature vacuum condition, and after the formation, the phosphor layer is taken out from a vapor deposition furnace in a room temperature condition. For this reason, a significant thermal stress is exerted particularly on a portion near a periphery of the photoelectric conversion panel, and hence the phosphor layer is liable to be peeled at the portion near the periphery of the photoelectric conversion panel.

In the field of a medical diagnosis equipment, in particular, a narrower frame, i.e., a shorter distance from an end portion of the photoelectric conversion panel to a detecting unit for detecting a radiation is required. In particular, in a radiation detecting apparatus for mammography, a short distance of, for example, 2 mm or less is required as a distance from a chest wall to the detecting unit.

SUMMARY OF THE INVENTION

It is an object of the present invention to provide a radiation detecting apparatus configured to prevent peeling of a phosphor layer at a portion near a periphery of a photoelectric conversion panel, and to achieve a narrower frame. According to one aspect of the present invention, there is provided a radiation detecting apparatus, including: a scintillator configured to convert a radiation into light; and a photoelectric conversion panel including a photoelectric conversion section configured to convert the light from the scintillator into an electrical signal, in which the photoelectric conversion panel further includes a frame member disposed on an outer side of the photoelectric conversion section along at least a portion of at least one side of the photoelectric conversion panel, in which the frame member includes an inclined surface having a downward slope toward the photoelectric conversion section, in which the scintillator includes: a first scintillator formed continuously on the inclined surface of the frame member and a surface of the photoelectric conversion section; and a second scintillator formed on the first scintillator, in which the first scintillator has a non-columnar crystal structure, and in which the second scintillator has a columnar crystal structure.

Further, according to another aspect of the present invention, there is provided a radiation detecting system, including: a radiation source configured to generate a radiation; and the above-mentioned radiation detecting apparatus. The radiation detecting apparatus according to one embodiment of the present invention has an excellent adhesiveness of the scintillator and is configured to prevent peeling of the scintillator near the periphery of the photoelectric conversion panel due to a thermal stress. Further, a narrower frame can be achieved, and hence the radiation detecting apparatus according to one embodiment of the present invention is suitable as a radiation detecting apparatus for a mammography.

DESCRIPTION OF THE EMBODIMENTS

A radiation detecting apparatus and a radiation detecting system according to the present invention are described below with reference to the accompanying drawings. In the present invention, a radiation includes an electromagnetic wave such as X-ray, α-ray, β-ray, and γ-ray.

First Embodiment

Figure 1:
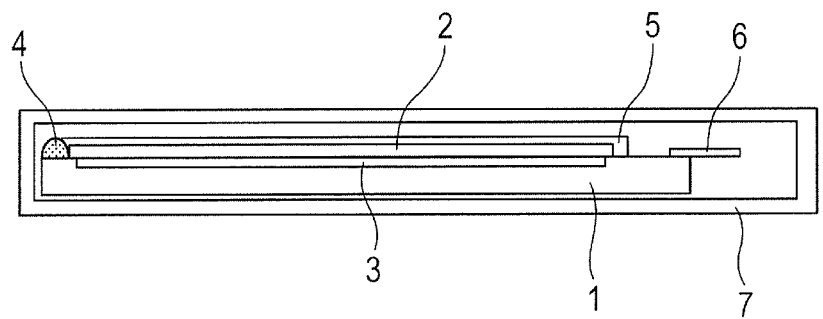
FIG. 1 is a cross-sectional view of a radiation detecting apparatus according to a first embodiment of the present invention.
Figure 2:
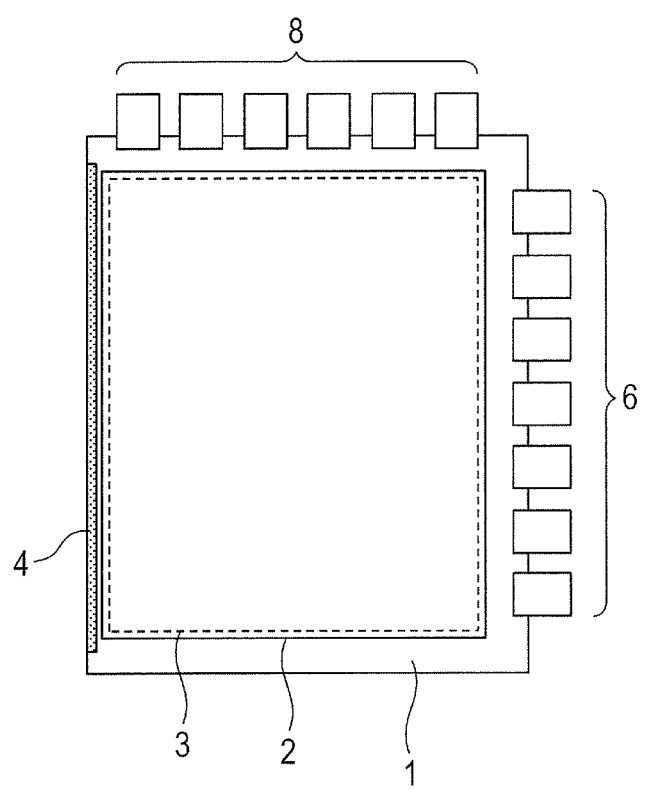
FIG. 2 is a plan view of a photoelectric conversion panel of the radiation detecting apparatus illustrated in FIG. 1.

FIG. 1 is a cross-sectional view of a radiation detecting apparatus according to a first embodiment of the present invention. As illustrated in FIG. 1, the radiation detecting apparatus according to the first embodiment includes a photoelectric conversion panel 1, a scintillator 2, a photoelectric conversion section 3, a frame member 4, a scintillator protecting layer 5, a read IC 6, and an external cover 7. FIG. 2 is a plan view of the photoelectric conversion panel 1 of the radiation detecting apparatus illustrated in FIG. 1, and a drive IC 8 is further provided in FIG. 2. In FIG. 2, the scintillator protecting layer 5 is omitted.

The photoelectric conversion panel 1 includes the photoelectric conversion section (effective area) 3 including photoelectric conversion elements arranged in a two-dimensional array on a substrate such as an insulating substrate of glass, a heat-resistant plastic, or the like or a single-crystal semiconductor substrate of single-crystal Si or the like. The photoelectric conversion elements are driven by the drive IC 8 provided on an outer side of the photoelectric conversion section 3. The photoelectric conversion elements are configured to convert light, which is converted from a radiation by the scintillator 2, into an electrical signal, and can be made of a material such as amorphous silicon. A configuration of each of the photoelectric conversion elements is not particularly limited, but a MIS-type sensor, a PIN-type sensor, a TFT-type sensor, or the like can be used as appropriate. The frame member 4 is formed on an outer side of the photoelectric conversion section 3 of the photoelectric conversion panel 1 along at least a portion of one side of the photoelectric conversion panel 1, which is free of a lead wiring of the read IC 6 and the like. A cross section of the frame member 4 on a plane perpendicular to a longitudinal direction of the frame member 4 is formed into a semicircular shape with an inclined surface having a downward slope toward the photoelectric conversion section 3. The scintillator 2 is provided at least on the photoelectric conversion section 3 and is configured to convert the radiation into light in a wavelength band, which is detectable by the photoelectric conversion elements of the photoelectric conversion section 3.

Figure 3:
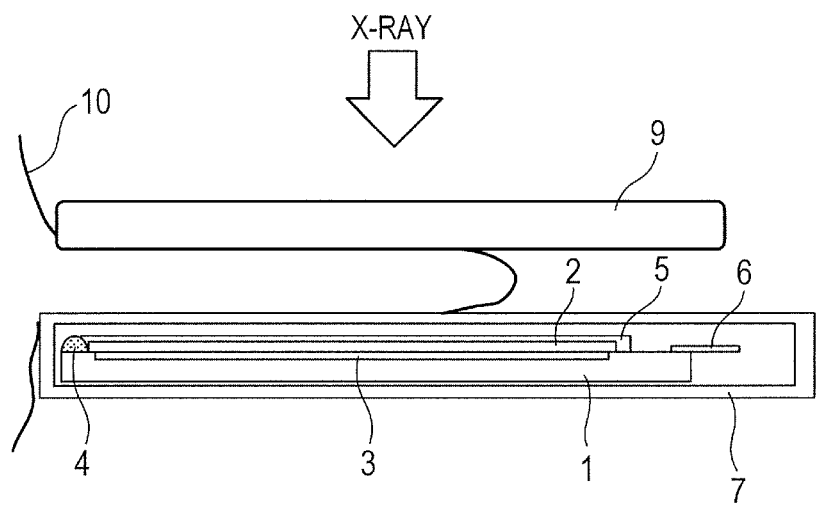
FIG. 3 is a schematic view illustrating a mammography using the radiation detecting apparatus illustrated in FIG. 1.

FIG. 3 is a schematic view illustrating a mammography using the radiation detecting apparatus illustrated in FIG. 1. In FIG. 3, a breast 10 of a subject is pressed by a pressing plate 9. As illustrated in FIG. 3, the radiation detecting apparatus is arranged so that a side of the radiation detecting apparatus on which the frame member 4 is provided is positioned on the chest wall side. The breast 10 of the subject is sandwiched by the pressing plate 9 and the radiation detecting apparatus, and then the breast 10 is irradiated with an X-ray. The X-ray is converted into light by the scintillator 2, and the light is converted into an electrical signal by the photoelectric conversion section 3. The electrical signal is obtained as an image via a processing circuit (not shown) from the read IC 6 formed on the outer side of the photoelectric conversion section 3.

Figure 4:
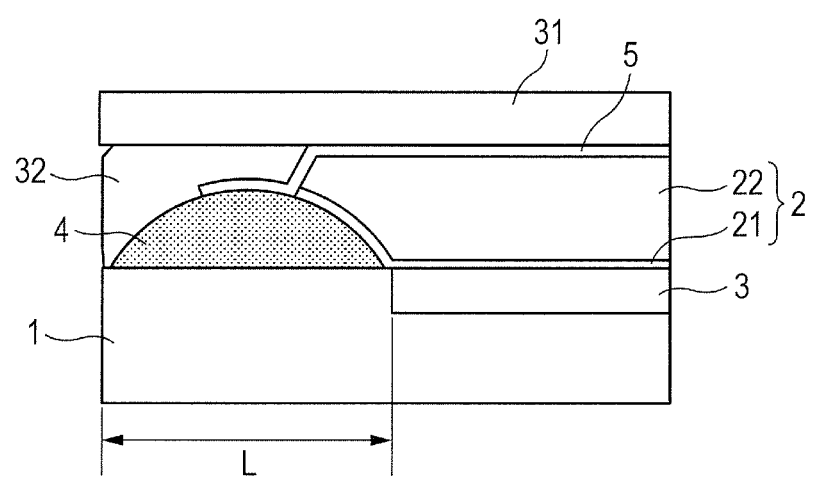
FIG. 4 is an enlarged cross-sectional view of the vicinity of a frame member of the radiation detecting apparatus according to the first embodiment.

FIG. 4 is an enlarged cross-sectional view of the vicinity of the frame member 4 of the radiation detecting apparatus according to the first embodiment. A first scintillator 21, a second scintillator 22, a base 31, and a peripheral sealing member 32 are provided in FIG. 4.

The frame member 4 is provided on the outer side of the photoelectric conversion section 3 of the photoelectric conversion panel 1 along at least a portion of at least one side of the photoelectric conversion panel 1. The frame member 4 is brought into contact with an end portion of the scintillator 2, and functions as a protecting layer for the scintillator 2.

It suffices that the frame member 4 include an inclined surface having a downward slope toward the photoelectric conversion section 3, and an inclination angle of the inclined surface is not particularly limited. In addition, the cross-sectional shape on the plane perpendicular to the longitudinal direction is, for example, semicircular or semielliptical, but the shape is not particularly limited.

As a material of the frame member 4, a general organic sealing material such as a silicone resin, an acrylic resin, an epoxy resin, or a polyurethane resin may be used.

Of these materials, it is particularly desired to use a material that is a resin having low water permeability and withstands a thermal process at a scintillator forming step (in the case of a scintillator having a columnar crystal structure, for example, 200° C. or more). Further, when the radiation detecting apparatus is used as a cassette-type radiation detecting apparatus for a mammography, as illustrated in FIG. 3, the side of the radiation detecting apparatus on which the frame member 4 is provided is positioned on the chest wall side. Therefore, it is preferred that a distance L from a side surface on which the frame member 4 of the photoelectric conversion panel 1 is formed to an end portion of the photoelectric conversion section 3 on the frame member 4 side be equal to or shorter than 2 mm. In order to form the frame member according to the present invention in a range of the distance L described above, it is preferred to use a material having high viscosity/high thixotropy, specifically, a resin material having a viscosity of 30 Pa·s or more and a thixotropic ratio of 2 or more. The viscosity is herein indicated by a resistance when stirring a resin material at 25° C. and 2.5 rpm, and the thixotropic ratio is herein indicated by a ratio of a viscosity when stirring the resin material at 25° C. and 2.5 rpm to a viscosity when stirring the resin material at 25° C. and 0.5 rpm (viscosity at 2.5 rpm/viscosity at 0.5 rpm).

Shape maintaining property at the time of forming the frame member was evaluated. Specifically, "○" represents an evaluation that a desired shape was achieved (the cross-sectional shape on the plane perpendicular to the longitudinal direction was a semicircle having a diameter of 1 mm) as a result of applying and curing a resin material paste of the frame member, "Δ" represents an evaluation that the desired shape was not easily achieved, and "x" represents an evaluation that the desired shape was not able to be achieved. Results obtained by using an epoxy resin paste are shown in Table 1, and results obtained by using a polyurethane resin paste are shown in Table 2.

TABLE 1

| Characteristic | Viscosity [Pa·s] | Thixotropic ratio | Result |
|---|---|---|---|
| Low viscosity/low thixotropy | 16 | 1.3 | Δ |
| Low viscosity/high thixotropy | 20 | 2.8 | Δ |
|  | 20 | 2.8 | Δ |
|  | 22 | 3.8 | Δ |
| High viscosity/low thixotropy | 30 | 1.8 | Δ |
|  | 35 | 1.9 | Δ |
|  | 45 | 1.7 | Δ |
| High viscosity/high thixotropy | 30 | 2.5 | ○ |
|  | 35 | 2.8 | ○ |
|  | 40 | 3.4 | ○ |
|  | 41 | 3.0 | ○ |
|  | 50 | 2.1 | ○ |

TABLE 2

| Characteristic | Viscosity [Pa·s] | Thixotropic ratio | Result |
|---|---|---|---|
| Low viscosity/high thixotropy | 9 | 2.4 | Δ |
|  | 25 | 4.2 | Δ |
| High | 44 | 5.2 | ○ |

TABLE 2-continued

| Characteristic | Viscosity [Pa·s] | Thixotropic ratio | Result |
|---|---|---|---|
| viscosity/high thixotropy | 63 | 3.8 | ○ |

The scintillator 2 is configured to convert the radiation into light that is detectable by the photoelectric conversion elements, and includes the first scintillator 21 having a non-columnar crystal structure and the second scintillator 22 having a columnar crystal structure.

The second scintillator 22 having the columnar crystal structure generates less scattering light because the light generated in the scintillator propagates through a columnar crystal, and causes the light to arrive at the photoelectric conversion section 3 with high efficiency, with the result that the resolution can be improved. However, the second scintillator 22 having the columnar crystal structure is an aggregate of the columnar crystals that are separated from each other, and hence the adhesive force thereof is weak, with the result that the second scintillator 22 is liable to be peeled off. To cope with this problem, the first scintillator 21 having the non-columnar crystal structure is continuously formed on the inclined surface of the frame member 4 having a downward slope toward the photoelectric conversion section 3, and on a surface of the photoelectric conversion section 3, and the second scintillator 22 having the columnar crystal structure is formed on the first scintillator 21. The surface of the first scintillator 21 having the non-columnar crystal structure is caused to adhere to the surface of the photoelectric conversion section 3 and the inclined surface of the frame member 4, and the first scintillator 21 supports the second scintillator 22 formed on the first scintillator 21. With this configuration, the scintillator can be prevented from being peeled due to the thermal stress. Further, the adhesiveness of the scintillator 2 is enhanced by using the inclined surface of the frame member 4, and hence the narrower frame can be achieved. It is preferred that the first scintillator 21 be thicker from a standpoint of preventing the peeling of the scintillator 2, but the first scintillator 21 has the non-columnar crystal structure, and hence the light becomes the scattering light, with the result that sharpness is liable to be degraded. For this reason, it is preferred that the thickness of the first scintillator 21 be 10% or less of a thickness of the scintillator 2. The thickness of the scintillator 2 is set as appropriate depending on a purpose of photography, but in general, the thickness thereof is 100 μm to 1,000 μm, and hence it is preferred that the thickness of the first scintillator 21 be 10 μm to 100 μm.

As a material of the scintillator 2, a material containing an alkali halide as a main component is suitably used. Examples thereof include cesium iodide activated with thallium (CsI:Tl), CsI:Na, CsBr:Tl, NaI:Tl, LiI:Eu, and KI:Tl, and CsI:Tl is suitably used. In the case of, for example, CsI:Tl, the scintillator 2 can be formed by simultaneously depositing cesium iodide (CsI) and thallium iodide (TlI). It is preferred that the first scintillator and the second scintillator 22 be made of the same material, and that both the first scintillator 21 and the second scintillator 22 be made of CsI:Tl.

It is preferred that the scintillator protecting layer 5 have a moisture-proof protecting function of preventing penetration of moisture from outside air and an impact protecting function of preventing structural breakage due to impact. In particular, CsI:Tl has high deliquescence with respect to the moisture, and hence the moisture-proof protecting function is required. As illustrated in FIG. 4, it is preferred that the scintillator protecting layer 5 be formed on the scintillator 2 and the frame member 4. With this configuration, the moisture-proofness is improved for the scintillator 2 by using the inclined surface of the frame member 4, and hence the narrower frame can be achieved. It is preferred that a thickness of the scintillator protecting layer 5 be 20 μm to 200 μm. When the thickness of the scintillator protecting layer 5 is less than 20 μm, it is hard to completely cover unevenness and a splash defect on the surface of the scintillator 2, and hence the moisture-proof protecting function is liable to be degraded. On the other hand, when the thickness of the scintillator protecting layer 5 is more than 200 μm, the light generated in the scintillator 2 is scattered more significantly in the scintillator protecting layer 5, and hence a resolution and a modulation transfer function (MTF) of an image to be obtained are liable to be degraded. As a material of the scintillator protecting layer 5, there may be used, for example, a general organic sealing material such as a silicone resin, an acrylic resin, an epoxy resin, or a polyvinylidene chloride, or a hot melt resin such as a polyester-based, polyolefin-based, or polyamide-based hot melt resin. Of those materials, it is particularly desired to use a resin having low water permeability.

The base 31 is arranged on the frame member 4 and the scintillator protecting layer 5, and a space between the base 31 and the frame member 4 is sealed with the peripheral sealing member 32. It is preferred that the base 31 be made of amorphous carbon or the like that less absorbs the X-ray. Further, it is preferred that the peripheral sealing member 32 be made of an epoxy material, an acrylic material, a urethane material, or the like that less absorbs the moisture.

FIGS. 5A, 5B, 5C, and 5D are explanatory views illustrating a method of manufacturing the radiation detecting apparatus according to the first embodiment, which are enlarged cross-sectional views of the vicinity of the frame member 4 in the similar manner to FIG. 4. A holder 41 is provided in FIGS. 5A and 5B.

Figure 5A:
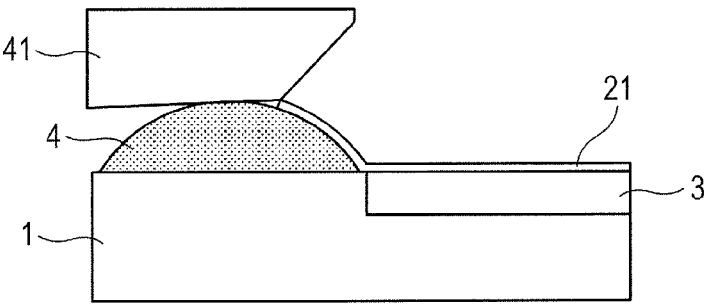
FIGS. 5A, 5B, 5C, and 5D are explanatory views illustrating a method of manufacturing the radiation detecting apparatus according to the first embodiment.

As illustrated in FIG. 5A, through use of a dispense device or a screen printing device, the frame member 4 having a semicircular cross section on a plane perpendicular to the longitudinal direction is formed on the outer side of the photoelectric conversion section 3 of the photoelectric conversion panel 1 along a portion of one side of the photoelectric conversion panel 1, which is free of a lead wiring.

An end portion of the photoelectric conversion panel 1 on the frame member 4 side is held by the holder 41, and then the first scintillator 21 made of CsI:Tl is formed by vapor deposition in a high temperature vacuum condition with, for example, CsI as a base compound and TlI as an activator agent. The first scintillator 21 is continuously formed on the inclined surface of the frame member 4, which is not masked by the holder 41, and on the surface of the photoelectric conversion section 3. The columnar crystal is not formed at the initial stage of the vapor deposition, and hence the first scintillator 21 is formed as a thin film having the non-columnar crystal structure.

Figure 5B:
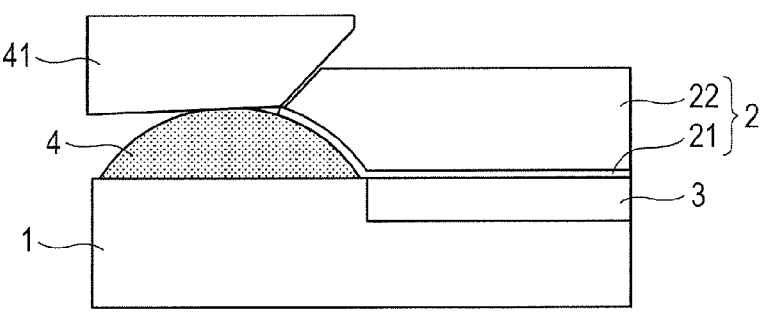

When the vapor deposition is continued after forming the first scintillator 21, as illustrated in FIG. 5B, a columnar crystal having a diameter of several micrometers is grown at a starting point from the first scintillator 21 formed at the initial stage of the vapor deposition, and hence the second scintillator 22 having the columnar crystal structure of CsI:Tl is formed.

Figure 5C:
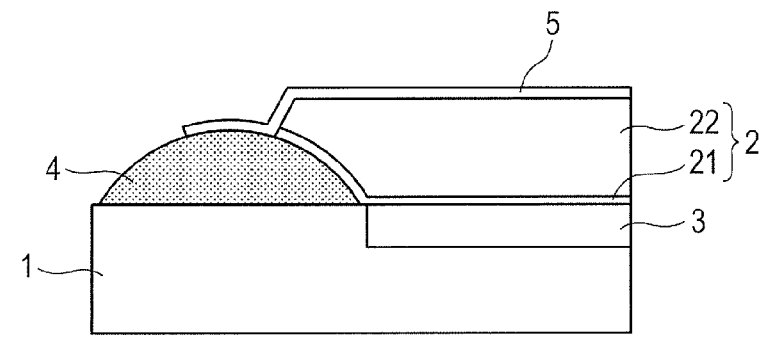

Subsequently, as illustrated in FIG. 5C, the holder 41 is removed and the scintillator protecting layer is formed on the scintillator 2. At this time, the scintillator protecting layer 5 is formed so as to adhere to the surface of the scintillator 2 and to be brought into contact with the surface of the frame member 4, and hence the scintillator 2 is covered with the frame member 4 and the scintillator protecting layer 5.

Figure 5D:
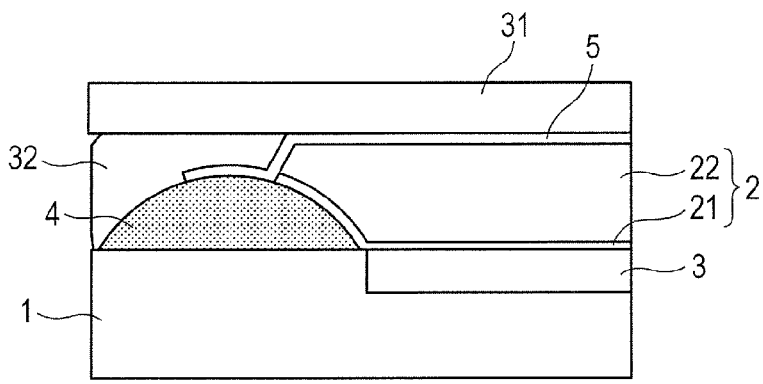

Subsequently, as illustrated in FIG. 5D, the base 31 is arranged on the frame member 4 and the scintillator protecting layer 5, and the space between the base 31 and the frame member 4 is sealed with the peripheral sealing member 32, thus obtaining the radiation detecting apparatus.

Second Embodiment

Figure 6A:
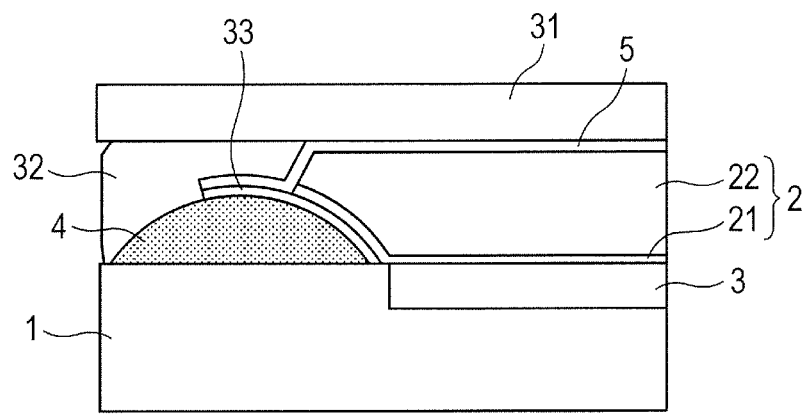
FIGS. 6A and 6B are enlarged cross-sectional views of the vicinity of a frame member of a radiation detecting apparatus according to a second embodiment of the present invention.
Figure 6B:
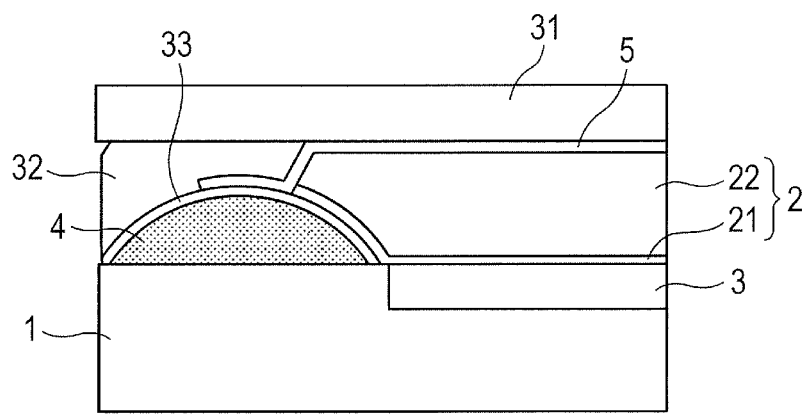

FIGS. 6A and 6B are views illustrating a radiation detecting apparatus according to a second embodiment of the present invention, which are enlarged cross-sectional views of the vicinity of the frame member 4 in the similar manner to FIG. 4. The second embodiment is similar to the first embodiment except that a moisture-proof protective film 33 is provided on the frame member 4, and the scintillator 2 is formed on the moisture-proof protective film 33.

According to the second embodiment, the moisture-proofness at the end portion of the scintillator 2 can be further improved, and hence a higher quality radiation detecting apparatus can be provided. Further, the moisture-proofness for the scintillator 2 is improved by using the inclined surface of the frame member 4, and hence the narrower frame can be achieved. The moisture-proof protective film 33 may be formed on a portion of the frame member 4 as illustrated in FIG. 6A, but the moisture-proof protective film 33 may be formed on substantially the entire surface of the frame member 4 as illustrated in FIG. 6B so that the moisture-proofness can be further improved.

In addition, as illustrated in FIGS. 6A and 6B, the moisture-proof protective film 33 and the scintillator protecting layer 5 are brought into contact with each other, with the result that high moisture-proofness can be ensured at the end portion of the scintillator 2. At this time, the moisture-proof protective film 33 and the scintillator protecting layer 5 are made of the same material, and hence the adhesiveness of the moisture-proof protective film 33 and the scintillator protecting layer 5 can be improved. The same materials as those described for the scintillator protecting layer 5 can be used as materials of the moisture-proof protective film, and it is preferred to use a polyvinylidene chloride from a standpoint of applicability.

Third Embodiment

Figure 7:
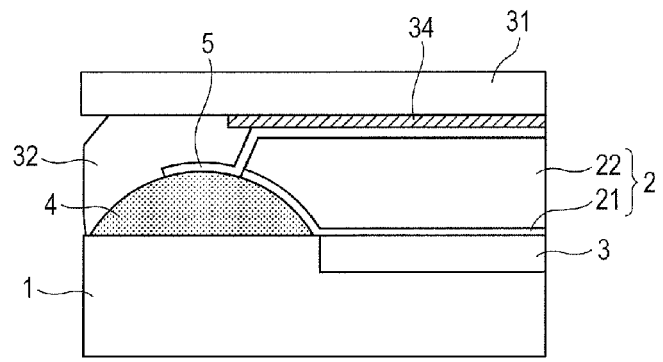
FIG. 7 is an enlarged cross-sectional view of the vicinity of a frame member of a radiation detecting apparatus according to a third embodiment of the present invention.

FIG. 7 is a view illustrating a radiation detecting apparatus according to a third embodiment of the present invention, which is an enlarged cross-sectional view of the vicinity of the frame member 4 in the similar manner to FIG. 4. The third embodiment is similar to the first embodiment except that a light absorbing layer 34 is provided on an upper surface of the scintillator protecting layer 5 on the scintillator 2. In a mammography, an area having a low contrast, such as fat or mammary gland, is to be examined, and presence and absence of a small calcified particle of about 0.1 mm to 1 mm are determined in this area. Thus, high sharpness is required. A part of the light emitted from the scintillator 2 is reflected at the base 31 side and enters the photoelectric conversion section 3. However, this reflected light has property to degrade the sharpness, and hence the light absorbing layer 34 absorbs the reflected light, thus achieving even higher sharpness. A conventionally known material can be used for the light absorbing layer 34.

Radiation Detecting System

Figure 8:
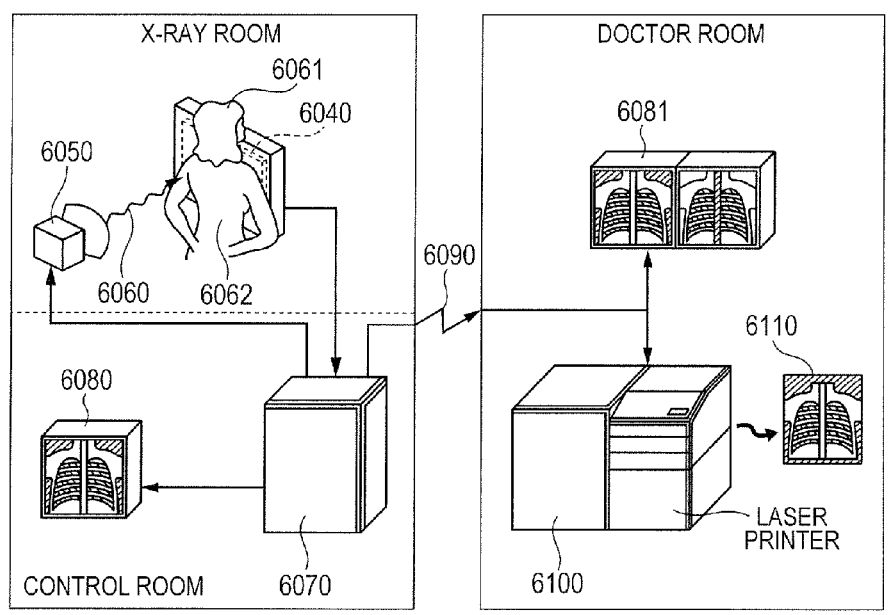
FIG. 8 is a schematic diagram of a radiation detecting system employing the radiation detecting apparatus according to the present invention.

FIG. 8 is a schematic diagram of a radiation detecting system employing the radiation detecting apparatus according to the present invention.

In an X-ray room, an X-ray 6060 generated from an X-ray tube 6050 serving as a radiation source passes through a chest area 6062 of a patient or subject 6061 and enters each of the photoelectric conversion elements of a radiation imaging device 6040 including the radiation detecting apparatus according to the present invention. The X-ray 6060 thus entering each of the photoelectric conversion elements contains information on the inside of the body of the patient or subject 6061. In response to the entry of the X-ray 6060, a photoelectric conversion section of the radiation imaging apparatus 6040 converts the X-ray 6060 into an electrical charge to obtain electrical information. This information is converted into digital data and subjected to image processing by an image processor 6070 serving as a signal processing unit, and an image can be observed on a display 6080 serving as a display unit in a control room.

Further, this information can be transferred to a remote place by a transmission processing unit such as a telephone line 6090, and hence the information can be displayed on a display 6081 serving as a display unit or recorded on a recording unit such as an optical disc in a doctor room or the like at a different place so that a doctor at the remote place can perform a diagnosis. In addition, the information can be recorded on a film 6110 serving as a recording medium by a film processor 6100 serving as a recording unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-056433, filed Mar. 19, 2013, which is hereby incorporated by reference herein in its entirety.

What is claimed is:

1. A radiation detecting apparatus, comprising:
   a scintillator configured to convert a radiation into light; and
   a photoelectric conversion panel comprising a photoelectric conversion section configured to convert the light from the scintillator into an electrical signal,
   wherein the photoelectric conversion panel further comprises a frame member disposed on an outer side of the photoelectric conversion section along at least a portion of at least one side of the photoelectric conversion panel,
   wherein the frame member comprises an inclined surface having a downward slope toward the photoelectric conversion section, and
   wherein the scintillator comprises:
      a first scintillator having a non-columnar crystal structure formed by vapor deposition continuously on the inclined surface of the frame member and a surface of the photoelectric conversion section; and
      a second scintillator having a columnar crystal structure continuously formed by vapor deposition on the first scintillator.

2. The radiation detecting apparatus according to claim 1, wherein the first scintillator and the second scintillator are made of the same material.

3. The radiation detecting apparatus according to claim 2, wherein the first scintillator and the second scintillator are formed by vapor deposition with cesium iodide as a main compound and thallium iodide as an activator agent.

4. The radiation detecting apparatus according to claim 1, further comprising a moisture-proof protective film between the frame member and the first scintillator.

5. The radiation detecting apparatus according to claim 4, wherein the moisture-proof protective film is provided on an entire surface of the frame member.

6. The radiation detecting apparatus according to claim 4, further comprising a scintillator protecting layer on a surface of the second scintillator,
wherein the scintillator protecting layer and the moisture-proof protective film are in contact with each other on the frame member.

7. The radiation detecting apparatus according to claim 6, wherein the moisture-proof protective film and the scintillator protecting layer are made of the same material.

8. The radiation detecting apparatus according to claim 1, wherein the frame member is provided on a portion of the photoelectric conversion panel, which is free of a lead wiring.

9. The radiation detecting apparatus according to claim 1, wherein a cross section of the frame member on a plane perpendicular to a longitudinal direction of the frame member has one of a semicircular shape and a semielliptical shape.

10. The radiation detecting apparatus according to claim 1, wherein the frame member is made of a resin material having a viscosity of 30 Pa·s or more and a thixotropic ratio of 2 or more.

11. A radiation detecting system comprising:
a radiation detecting apparatus, comprising:
a scintillator configured to convert a radiation into light; and
a photoelectric conversion panel comprising:
a photoelectric conversion section configured to convert the light from the scintillator into an electrical signal, and
a frame member disposed on an outer side of the photoelectric conversion section along at least a portion of at least one side of the photoelectric conversion panel,
wherein the frame member comprises an inclined surface having a downward slope toward the photoelectric conversion section, and
wherein the scintillator comprises: a first scintillator having a non-columnar crystal structure formed by vapor deposition continuously on the inclined surface of the frame member and a surface of the photoelectric conversion section; and a second scintillator having a columnar crystal structure continuously formed by vapor deposition on the first scintillator,
a signal processing unit configured to process a signal from the radiation detecting apparatus;
a recording unit configured to record a signal from the signal processing unit;
a display unit configured to display the signal from the signal processing unit; and
a transmission processing unit configured to transmit the signal from the signal processing unit.

12. A method of producing a radiation detecting apparatus comprising a scintillator configured to convert a radiation into light and a photoelectric conversion panel comprising a photoelectric conversion section configured to convert the light from the scintillator into an electrical signal, the method comprising:
a first step of forming a frame member on an outer side of the photoelectric conversion section along at least a portion of at least one side of the photoelectric conversion panel, the frame member comprising an inclined surface having a downward slope toward the photoelectric conversion section;
a second step of forming a first scintillator having a non-columnar crystal structure by vapor deposition continuously on a surface of the inclined surface of the frame member and a surface of the photoelectric conversion section; and
a third step of forming a second scintillator having a columnar crystal structure continuously by vapor deposition on the first scintillator.

13. The method of producing a radiation detecting apparatus according to claim 12, wherein the first scintillator and the second scintillator are made of the same material.

14. The method of producing a radiation detecting apparatus according to claim 13, wherein the first scintillator and the second scintillator are formed by vapor deposition with cesium iodide as a main compound and thallium iodide as an activator agent.

15. The method of producing a radiation detecting apparatus according to claim 12, the second step comprises forming a moisture-proof protective film on at least a surface of the inclined surface of the frame member and forming the first scintillator having a non-columnar crystal structure by vapor deposition continuously on a surface of the moisture-proof protective film and the surface of the photoelectric conversion section.

16. The method of producing a radiation detecting apparatus according to claim 15, further comprising a fourth step of forming a scintillator protecting layer on a surface of the second scintillator, wherein the scintillator protecting layer and the moisture-proof protective film are in contact with each other on the frame member, and wherein the moisture-proof protective film and the scintillator protecting layer are made of the same material.

17. The method of producing a radiation detecting apparatus according to claim 12, wherein the first step comprises forming the frame member on a portion of the photoelectric conversion panel, which is free of a lead wiring.

18. The method of producing a radiation detecting apparatus according to claim 12, wherein the first step comprises forming the frame member such that a cross section of the frame member on a plane perpendicular to a longitudinal direction of the frame member has one of a semicircular shape and a semielliptical shape.

19. The method of producing a radiation detecting apparatus according to claim 12, wherein the frame member is made of a resin material having a viscosity of 30 Pa·s or more and a thixotropic ratio of 2 or more.

* * * * *